US012432522B2

(12) United States Patent
Fukushima

(10) Patent No.: US 12,432,522 B2
(45) Date of Patent: Sep. 30, 2025

(54) SERVICE PROVIDING SYSTEM, SERVICE PROVIDING METHOD AND PROGRAM

(71) Applicant: RAKUTEN GROUP, INC., Tokyo (JP)

(72) Inventor: Sachiko Fukushima, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 24 days.

(21) Appl. No.: 17/784,092

(22) PCT Filed: Mar. 26, 2021

(86) PCT No.: PCT/JP2021/012874
§ 371 (c)(1),
(2) Date: Jun. 9, 2022

(87) PCT Pub. No.: WO2022/201492
PCT Pub. Date: Sep. 29, 2022

(65) Prior Publication Data
US 2024/0267702 A1 Aug. 8, 2024

(51) Int. Cl.
*H04W 4/02* (2018.01)
(52) U.S. Cl.
CPC .................................... *H04W 4/02* (2013.01)
(58) Field of Classification Search
CPC ...................................................... H04W 4/02
USPC ...................................................... 455/456.1
See application file for complete search history.

(56) References Cited

U.S. PATENT DOCUMENTS

| 2014/0143104 | A1* | 5/2014 | Boncimino | G06Q 20/047 705/30 |
| 2014/0243023 | A1* | 8/2014 | Zhou | H04W 4/023 455/456.3 |
| 2014/0351351 | A1* | 11/2014 | Yu | H04L 51/52 709/206 |
| 2017/0041856 | A1* | 2/2017 | Kim | H04W 4/029 |
| 2018/0067969 | A1* | 3/2018 | Huang | H04W 4/30 |
| 2019/0392480 | A1 | 12/2019 | Ding et al. | |
| 2020/0364748 | A1 | 11/2020 | Ding et al. | |

FOREIGN PATENT DOCUMENTS

| JP | 2002245368 | A | * | 8/2002 | |
| JP | 2007153618 | A | * | 6/2007 | |
| JP | 2018097878 | A | * | 6/2018 | G06Q 30/0633 |

(Continued)

OTHER PUBLICATIONS

International Search Report of Jun. 22, 2021, relating International Patent Application for PCT/JP2021/012874, pp. 1-9.

(Continued)

Primary Examiner — Juan A Torres
(74) Attorney, Agent, or Firm — HEA Law PLLC

(57) ABSTRACT

At least one processor of a service providing system acquires first location information registered by a user in a first service. The at least one processor determines, when a second service provided at a designated location is used by the user, based on a predetermined condition, whether the first location information is to be utilized as second location information relating to the designated location. The at least one processor acquires the second location information based on a result of the determination.

18 Claims, 14 Drawing Sheets

(56) References Cited

FOREIGN PATENT DOCUMENTS

JP          2020504361 A     2/2020
WO      2009057215 A1    5/2009

OTHER PUBLICATIONS

Office Action of Sep. 6, 2022, for corresponding JP Patent Application No. 2022-531020 with partial English translation, pp. 1-6.

\* cited by examiner

FIG.5

| USER ID | PASSWORD | FULL NAME | POSTAL CODE | ADDRESS | TELEPHONE NUMBER | SECOND SERVICES |
|---|---|---|---|---|---|---|
| a00001 | ******** | TARO YAMADA | 158-AAAA | ... SETAGAYA-WARD, TOKYO | 090-XXXX-YYYY | DELIVERY SERVICE, MOTORCYCLE COURIER SERVICE, VEHICLE DISPATCH RESERVATION SERVICE... |
| a00002 | ****** | HANAKO ITO | 174-CCCC | ... ITABASHI-WARD, TOKYO | 03-DDDD-EEEE | DELIVERY SERVICE, BEAUTY SALON RESERVATION SERVICE, HOUSEKEEPING SERVICE... |
| a00003 | ********** | JIRO YOSHIDA | 108-FFFF | ... MINATO-WARD, TOKYO | 080-GGGG-HHHH | MOTORCYCLE COURIER SERVICE, VEHICLE DISPATCH RESERVATION SERVICE, TRAVEL RESERVATION SERVICE... |
| : | : | : | : | : | : | : |

| ORDER ID | FULL NAME | POSTAL CODE | ADDRESS | TELEPHONE NUMBER | ORDER CONTENT | ... |
|---|---|---|---|---|---|---|
| b00001 | TARO YAMADA | 158-AAAA | ... SETAGAYA-WARD, TOKYO | 090-XXXX-YYYY | MIXED PIZZA 2, POTATO 3, ... | ... |
| b00002 | TATSURO SATO | 108-IIII | ... MINATO-WARD, TOKYO | 03-JJJJ-KKKK | CHEESE PIZZA 1, COLA 2, ... | ... |
| b00003 | SADAKO MIZUNO | 210-LLLL | ... KAWASAKI CITY, KANAGAWA | 080-MMMM-NNNN | CORN PIZZA 2, CHICKEN 5, ... | ... |
| ... | ... | ... | ... | ... | ... | ... |

| TYPE OF SECOND SERVICE | FIRST LOCATION INFORMATION |
|---|---|
| DELIVERY SERVICE | HOME |
| MOTORCYCLE COURIER SERVICE | WORKPLACE |
| VEHICLE DISPATCH RESERVATION SERVICE | WORKPLACE |
| HOUSEKEEPING SERVICE | HOME |
| . . . | . . . |

FIG.13

| TYPE OF FIRST SERVICE | TYPE OF SECOND SERVICE |
|---|---|
| HAMBURGER DELIVERY SERVICE | PIZZA DELIVERY SERVICE |
| PACKAGE DELIVERY SERVICE | MOTORCYCLE COURIER SERVICE |
| HIRE CAR RESERVATION SERVICE | VEHICLE DISPATCH RESERVATION SERVICE |
| BABYSITTING SERVICE | HOUSEKEEPING SERVICE |
| ... | ... |

FIG.14

| PROVISION TIME | FIRST LOCATION INFORMATION |
|---|---|
| NIGHTTIME | HOME |
| DAYTIME | WORKPLACE |
| WEEKDAY | WORKPLACE |
| WEEKEND | HOME |
| . . . | . . . |

SERVICE PROVIDING SYSTEM, SERVICE PROVIDING METHOD AND PROGRAM

CROSS REFERENCE TO RELATED APPLICATIONS

This application is a National Stage of International Application No. PCT/JP2021/012874 filed on Mar. 26, 2021. The contents of the above document is incorporated herein by reference in its entirety.

TECHNICAL FIELD

The present disclosure relates to a service providing system, a service providing method, and a program.

BACKGROUND ART

Hitherto, there has been known a system which provides a plurality of services to a user. For example, in Patent Literature 1, there is described an application system which collectively manages user information by using a data warehouse common to a plurality of services. The application system selects, from among users who do not use a second service, a user who is likely to use the second service based on an action history of the user in a first service, and guides the user to the second service. When the user uses the second service, information on the first service registered in the data warehouse is referred to. When location information such as a home address has been registered by the user, the registered location information is utilized in the second service.

CITATION LIST

Patent Literature

[PTL 1] JP 2020-504361 A

SUMMARY OF INVENTION

Technical Problem

In some cases, in a service provided at a designated location, such as a food and beverage delivery service, it may not be possible to utilize location information registered in another service. For example, in the technology as described in Patent Literature 1, even when the location information on the home of the user who uses the first service is registered in the data warehouse, the user may want to use the second service by using the location information on his or her workplace. In this case, when the location information on his or her home registered in the first service is utilized in the second service, the user is required to delete the utilized location information on his or her home and re-input the location information on his or her workplace, and this takes time and effort.

An object of the present disclosure is to reduce time and effort of input by a user who uses a service provided at a designated location.

Solution to Problem

According to one aspect of the present disclosure, there is provided a service providing system including: first acquisition means for acquiring first location information registered by a user in a first service; determination means for determining, when a second service provided at a designated location is used by the user, based on a predetermined condition, whether the first location information is to be utilized as second location information relating to the designated location; and second acquisition means for acquiring the second location information based on a result of the determination obtained by the determination means.

Advantageous Effects of Invention

According to the present disclosure, the time and effort of input by the user who uses the service provided at the designated location can be reduced.

BRIEF DESCRIPTION OF DRAWINGS

FIG. 5 is a table for showing a data storage example of a first database.

FIG. 6 is a table for showing a data storage example of a second database.

FIG. 12 is a table for showing an example of a relationship between a type of the second service and first location information to be utilized.

FIG. 13 is a table for showing an example of a relationship between a type of the first service utilizing the first location information and the type of the second service.

FIG. 14 is a table for showing an example of a relationship between a provision time of the second service and the first location information to be utilized.

DESCRIPTION OF EMBODIMENTS

1. Overall Configuration of Service Providing System

Figure 1:
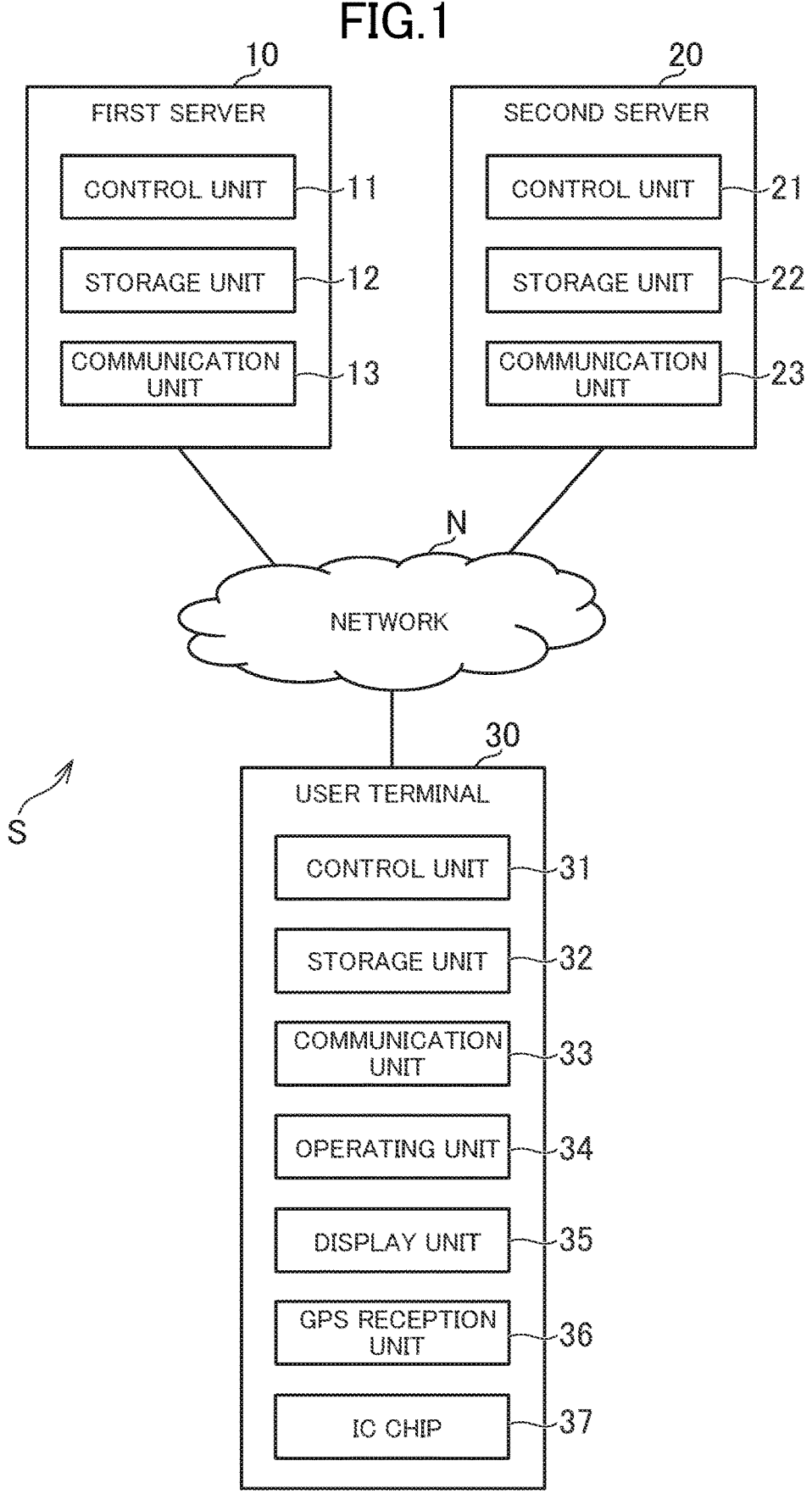
FIG. 1 is a diagram for illustrating an example of an overall configuration of a service providing system.

An example of a service providing system according to an embodiment of the present disclosure is now described. FIG. 1 is a diagram for illustrating an example of an overall configuration of the service providing system. As illustrated in FIG. 1, a service providing system S includes a first server 10, a second server 20, and a user terminal 30. Each of the first server 10, the second server 20, and the user terminal 30 can be connected to a network N such as the Internet. The service providing system S is not limited to the example illustrated in FIG. 1, as long as the service providing system S includes at least one computer.

The first server 10 is a server computer for providing a first service to a user. In this embodiment, a social networking service (SNS) is taken as an example of the first service. The first service is not limited to the example of this embodiment, and may be any service. Application examples of other services are described later in modification examples of the present disclosure. In FIG. 1, only one first server 10 is illustrated, but when a plurality of first services are provided, a plurality of first servers 10 may exist.

The first server 10 includes a control unit 11, a storage unit 12, and a communication unit 13. The control unit 11 includes at least one processor. The storage unit 12 includes a volatile memory such as a RAM, and a nonvolatile memory such as a hard disk drive. The communication unit 13 includes at least one of a communication interface for wired communication or a communication interface for wireless communication.

The second server 20 is a server computer for providing a second service to the user. In this embodiment, a food and drink delivery service and other service are described as examples of the second service. The second service is not limited to the example of this embodiment, and is only required to be a service different from the first service. Application examples of other services are described later in the modification examples. In FIG. 1, only one second server 20 is illustrated, but when a plurality of second services are provided, a plurality of second servers 20 may exist.

The second server 20 includes a control unit 21, a storage unit 22, and a communication unit 23. Physical configurations of the control unit 21, the storage unit 22, and the communication unit 23 are the same as those of the control unit 11, the storage unit 12, and the communication unit 13, respectively.

The user terminal 30 is a computer to be operated by a user. For example, the user terminal 30 is a smartphone, a tablet computer, a wearable terminal, or a personal computer. The user terminal 30 includes a control unit 31, a storage unit 32, a communication unit 33, an operating unit 34, a display unit 35, a GPS reception unit 36, and an IC chip 37. Physical configurations of the control unit 31, the storage unit 32, and the communication unit 33 are the same as those of the control unit 11, the storage unit 12, and the communication unit 13, respectively.

The operating unit 34 is an input device such as a touch panel. The display unit 35 is a liquid crystal display or an organic EL display. The GPS reception unit 36 includes a receiver which receives signals from satellites. The GPS reception unit 36 is used to acquire a current position of the user. The IC chip 37 may be a chip of any standards, for example, a chip of FeliCa (trademark) or a chip of a so-called Type A or Type B among the non-contact type standards.

At least one of programs or data stored in the first server 10, the second server 20, and the user terminal 30 may be supplied thereto via the network N. Further, each of the first server 10, the second server 20, and the user terminal 30 may include at least one of a reading unit (for example, an optical disc drive or a memory card slot) for reading a computer-readable information storage medium, or an input/output unit (for example, a USB port) for inputting and outputting data to/from an external device. For example, at least one of the program or the data stored in the information storage medium may be supplied through intermediation of at least one of the reading unit or the input/output unit.

2. Outline of Service Providing System

In this embodiment, it is assumed that the user has completed membership registration of the first service, but has not yet used the second service. An application (hereinafter referred to simply as "app") of the first service is installed on the user terminal 30. For example, the app of the first service is a so-called "super app." The app of the first service includes an app of the second service, which is a so-called "mini app." When the app of the first service is started, a home screen of the first service is displayed on the display unit 35.

Figure 2:
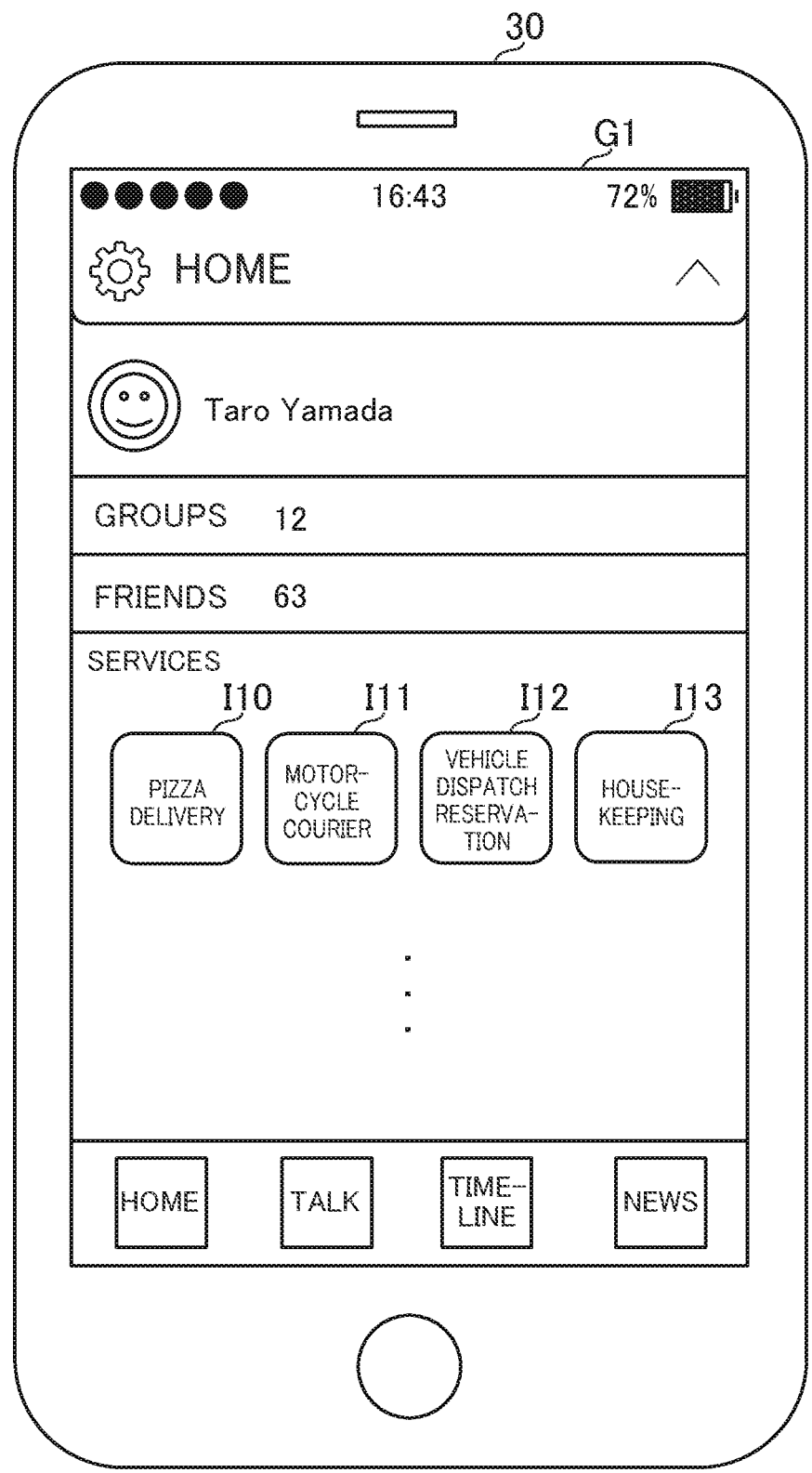
FIG. 2 is a diagram for illustrating an example of a home screen of a first service.

FIG. 2 is a diagram for illustrating an example of the home screen of the first service. The user can use the first service by selecting another user from a home screen G1 and transmitting a message, or by adding another user as a friend from the home screen G1. For example, on the home screen G1, icons I10 to I13 each indicating a corresponding one of the plurality of second services are displayed.

Each of the icons I10 to I13 is an icon of the above-mentioned mini app of the second service. The second service indicated by each of the icons I10 to I13 is a service in which a person or good (for example, food and drink, a food and drink delivery person, a package, a motorcycle courier delivery person, a taxi, or housekeeping staff) is provided at a designated location. In the following, a case in which the user uses the second service of "pizza delivery" indicated by the icon I10 is described as an example.

Figure 3:
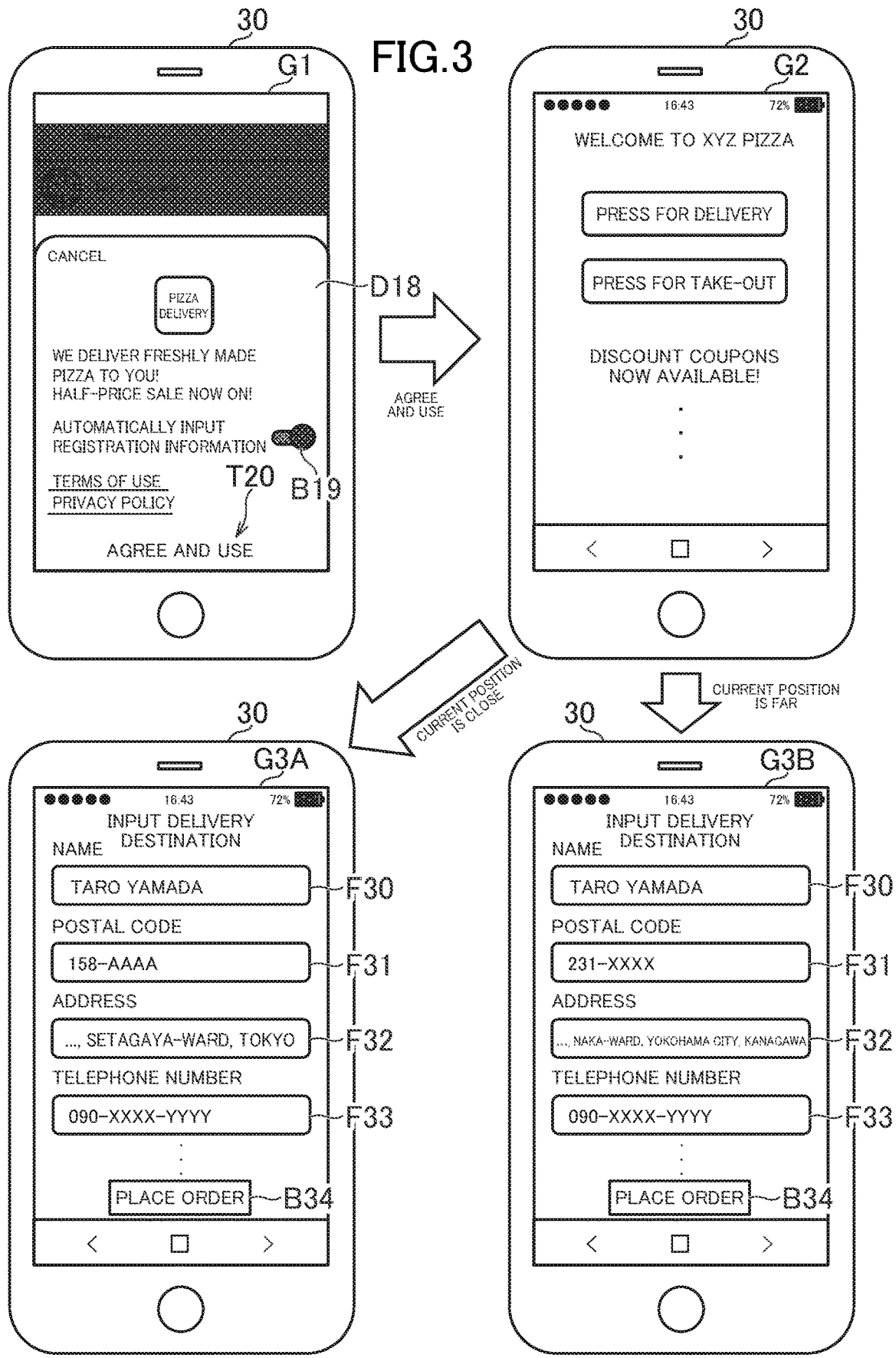
FIG. 3 is a diagram for illustrating an example of a process in which a user uses a second service from an app of a first service.

FIG. 3 is a diagram for illustrating an example of a process in which the user uses the second service from the app of the first service. As illustrated in FIG. 3, when the user selects the icon I10, a dialog D18 for checking the use of the second service is displayed on the home screen G1. The dialog D18 displays an outline of the second service and links to terms of use and privacy policy of the second service.

In this embodiment, the user can utilize his or her own registration information registered in the first service when using the second service. The registration information is information relating to the user registered at the time of becoming a member of the first service or after that. For example, the registration information is a full name, postal code, address, telephone number, or a combination of two or more of those. Those pieces of information correspond to personal information on the user, but information that is not personal information may correspond to the registration information.

When a button B19 of the dialog D18 is turned on by the user, the user can use the second service by utilizing the registration information registered in the first service. The user can also turn off the button B19 so that the registration information registered in the first service is not utilized in the second service. When the user selects a text T20 indicating that use of the mini app of the second service is to be started, a home screen G2 of the second service is displayed on the display unit 35.

The home screen G2 in this embodiment is a screen in which a homepage of the second service displayed by a browser is shown in the screen of the app of the first service. The home screen G2 is a so-called web view screen. The homepage may be the same as a normal homepage displayed from a normal browser, but in this embodiment, it is assumed that the homepage has been prepared for a mini app. Accordingly, content of the home page displayed on the home screen G2 is partially different from that of the normal home page. For example, in order to prevent the user from logging in to the second service, the input forms for the user ID and password of the second service are not displayed or a login button is not displayed.

The user displays a product list screen from the home screen G2 and selects a product. When the product is selected, the user designates a delivery destination of the product. When the button B19 of the dialog D18 has been turned on by the user, the registration information registered in the first service is utilized, and therefore the postal code and address of the user registered in the first service are utilized as the delivery destination. For example, when a home postal code and address are registered in the first service, the home postal code and address are utilized as the delivery destination.

However, the user may want the product to be delivered to another destination such as his or her workplace or a home of his or her friend instead of his or her own home. In this case, when the home postal code and address registered in the first service are utilized, the user is required to delete the utilized home postal code and address and re-input a correct delivery destination, and this takes time and effort. This point is the same when the postal code and address of a location other than the home of the user are registered in the first service.

It is also conceivable that the user terminal 30 uses the GPS reception unit 36 to acquire current position information relating to a current position of the user, and automatically inputs the postal code and address corresponding to the current position information as the delivery destination. However, in a case in which the delivery destination corresponding to the current position information is automatically input even when the user is at home, the postal code and address of another location may be automatically input incorrectly. Thus, in this embodiment, whether or not the postal code and address of the user registered in the first service is to be utilized is determined based on the current location information.

As illustrated in FIG. 3, when the current position of the user is in the vicinity of the location (for example, home) indicated by the postal code and address of the user registered in the first service, the postal code and address of the user registered in the first service are utilized and automatically input in input forms F31 and F32 of an input screen G3 for inputting the delivery destination (state of input screen G3A of FIG. 3). When the current position of the user is far from the location (for example, home) indicated by the postal code and address of the user registered in the first service, the current position of the user is automatically input in the input forms F31 and F32 of the input screen G3 (state of input screen G3B of FIG. 3).

Other registration information registered in the first service, such as the full name and telephone number of the user, are utilized and automatically input in input forms F30 and F33 of the input screen G3. When the user selects a button B34, details of the product selected by the user and the information input on the input screen G3 are transmitted to the second server 20, and the order is confirmed. A provider of the second service identifies the postal code and address input in the input forms F31 and F32 as the delivery destination, and delivers the product ordered by the user.

As described above, the service providing system S of this embodiment determines, based on the current position information, whether or not the postal code and address of the user registered in the first service are to be utilized in the second service. This reduces the time and effort of input by the user who uses the second service provided at the designated location. The details of this technology are now described.

3. Functions Implemented by Service Providing System

Figure 4:
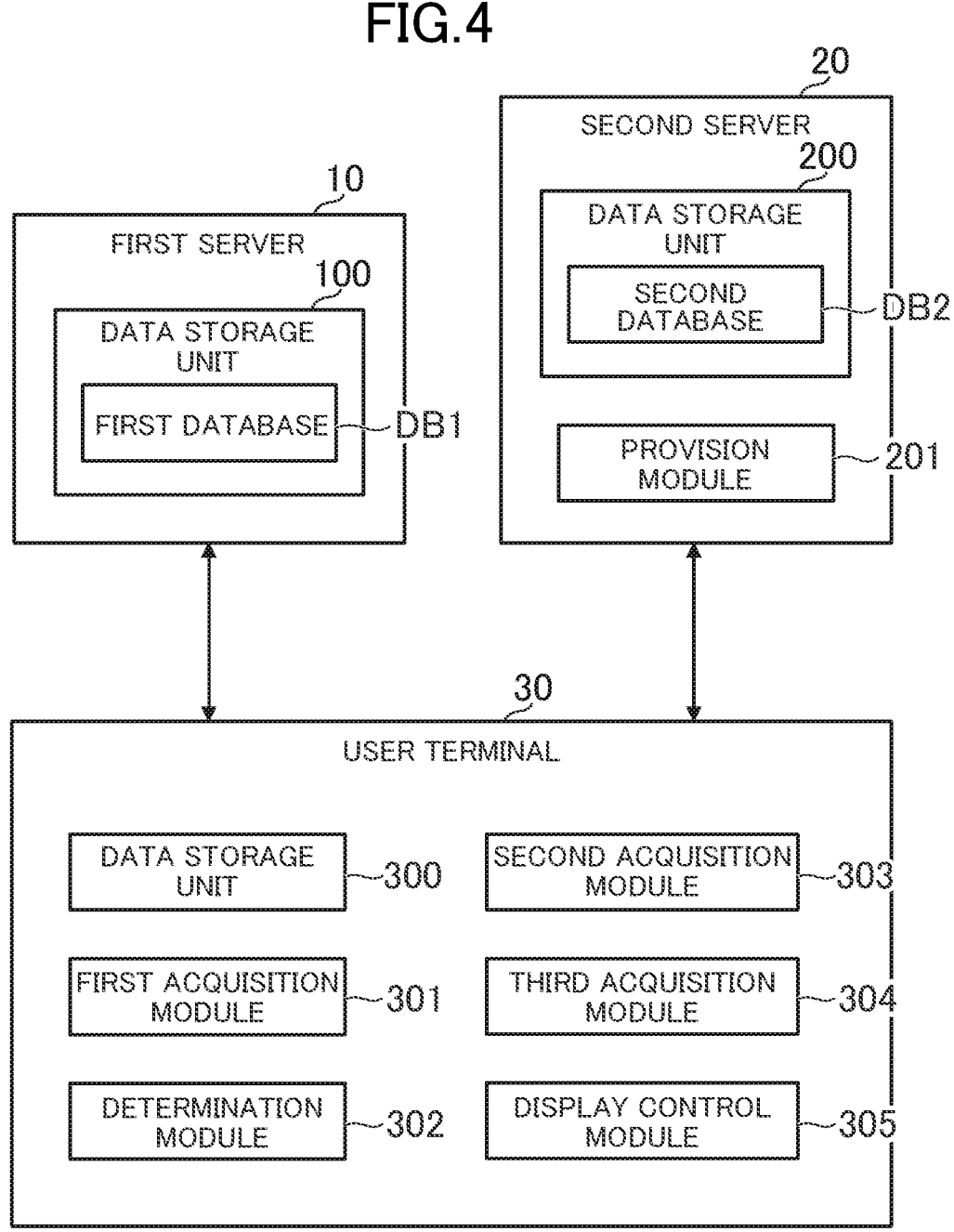
FIG. 4 is a functional block diagram for illustrating an example of functions implemented by the service providing system.

FIG. 4 is a functional block diagram for illustrating an example of functions implemented by the service providing system S.

[3-1. Functions Implemented by First Server]

As illustrated in FIG. 4, a data storage unit 100 is implemented by the first server 10. The data storage unit 100 stores data required in order to provide the first service to the user. For example, the data storage unit 100 stores a first database DB1.

FIG. 5 is a table for showing a data storage example of the first database DB1. As shown in FIG. 5, the first database DB1 is a database in which information relating to users who have registered as a member of the first service is stored. For example, the first database DB1 stores a user ID, a password, a full name, a postal code, an address, and a telephone number. Those pieces of information are examples of registration information.

When a user completes membership registration of the first service, a user ID that uniquely identifies the user is issued in the first service, and a record corresponding to the user is created in the first database DB1. Registration information such as the user ID is stored in the record. The registration information may be any information, and is not limited to the example of FIG. 5.

In this embodiment, the first database DB1 also stores information that can identify the second service that the user has started to use. For example, the first database DB1 stores a service name that can uniquely identify the second service, an on/off state of the button B19, another setting in the second service, and a usage history of the second service. However, in this embodiment, the second service is used by the user as a guest user, and therefore registration information for the second service is not stored.

[3-2. Functions Implemented by Second Server]

As illustrated in FIG. 4, a data storage unit 200 and a provision module 201 are implemented by the second server 20.

[Data Storage Unit]

The data storage unit 200 stores data required in order to provide the second service to the user. For example, the data storage unit 200 stores a second database DB2. Further, for example, the data storage unit 200 stores data of the website of the second service.

FIG. 6 is a table for showing a data storage example of the second database DB2. As shown in FIG. 6, the second database DB2 is a database in which information relating to details of the second service provided to the user is stored. In FIG. 6, a data storage example of the second service of "pizza delivery" indicated by the icon I10 is shown. For example, the second database DB2 stores an order ID, a full name, a postal code, an address, a telephone number, and order content.

When the user orders the product of the second service, an order ID that uniquely identifies the order is issued, and a record corresponding to the order is created in the second database DB2. In the record, the input information input at the time of ordering is stored together with the order ID. Each piece of information shown in FIG. 6 is an example of input information. The input information may be any information, and is not limited to the example of FIG. 6. The processing performed after the order is executed by the provision module 201 described later.

The second service in this embodiment is a service that the user can use as a guest user without registering as a member. Accordingly, in the second service, a user ID for uniquely identifying the user in the second service is not issued. In the second service, there is also no database in which user registration information is stored. The user can use the second service without logging in to the second service. The second database DB2 stores information on, for example, the postal code and address of the user for a certain order, but this information is not utilized in the next and subsequent orders of the user, and is information that is valid only for the certain order.

The second service is not limited to a service used by the user as a guest user. The second service may be a service in which membership registration occurs. In this case, when a certain user completes membership registration of the second service, the second service issues a user ID that uniquely identifies the user. The data storage unit 200 stores a database in which information relating to the user who has registered as a member of the second service is stored. In the database, the registration information designated at the time of registering to become a member is stored together with the user ID in the record corresponding to the user who has registered as a member. The information registered by the user for the second service overlaps in whole or in part with the information registered by the user for the first service.

[Provision Module]

The provision module 201 executes processing for providing the second service to the user based on second location information. In this embodiment, the provision module 201 executes processing for providing the second service to the user based on second location information without registering the second location information in the second service.

The second location information is information relating to a location designated in order to use the second service. The location is the provision destination (delivery destination or movement destination) of the person or good in the second service. In this embodiment, a case in which the postal code and the address designated on the input screen G3 correspond to the second location information is described. Accordingly, the postal code and the address (that is, the postal code and the address stored in the second database DB2) designated on the input screen G3 as used in this embodiment can be read as "second location information." The second location information may be any information that can identify the location, and is not limited to the postal code and the address. For example, the second location information may be only the address without including the postal code, or may be latitude/longitude information or coordinate information.

To provide the second service means to provide (deliver or move) the person or good in the second service to the location indicated by the second location information. For example, a delivery person or staff member corresponds to the person in the second service. Further, for example, a product, a package, a taxi, or a motorcycle corresponds to the good in the second service. To provide the person or good to the location indicated by the second location information means to move the person or good to the location indicated by the second location information.

It suffices that the provision module 201 executes the processing required in order to provide the second service. For example, when an order of a user is received, the provision module 201 creates a new record in the second database DB2, and stores the second location information and other information in association with the order ID. Further, for example, the provision module 201 notifies a person who visits the location indicated by the second location information of the second location information. Moreover, for example, the provision module 201 notifies the person preparing the good to be provided at the location indicated by the second location information of information that can identify the good.

[3-3. Functions Implemented by User Terminal]

As illustrated in FIG. 4, in the user terminal 30, a data storage unit 300, a first acquisition module 301, a determination module 302, a second acquisition module 303, a third acquisition module 304, and a display control module 305 are implemented. The data storage unit 300 is mainly implemented by the storage unit 32. Each of the other functions is mainly implemented by the control unit 31.

[Data Storage Unit]

The data storage unit 300 stores the data required in order to provide each of the first service and the second service to the user. For example, the data storage unit 300 stores the app of the first service. In this embodiment, a case in which the app of the second service is included in the app of the first service is described, but the app of the second service (app of the second service which is not a mini app) may exist separately from the app of the first service. The screens of each of FIG. 2 and FIG. 3 may be displayed as browser screens instead of app screens.

[First Acquisition Module]

The first acquisition module 301 acquires the first location information registered by the user in the first service. In this embodiment, a case in which the postal code and the address registered in the first service correspond to the first location information is described. Accordingly, the postal code and the address (that is, the postal code and the address stored in the first database DB1) registered in the first service as used in this embodiment can be read as "first location information." The first location information may be any information that can identify the location, and is not limited to the postal code and the address. For example, the first location information may be only the address without including the postal code, or may be latitude/longitude information or coordinate information.

In this embodiment, the first acquisition module 301 transmits the user ID of the user who is going to use the second service to the first server 10, and requests acquisition of the first location information. The first server 10 refers to the first database DB1, and transmits the postal code and the address associated with the user ID to the user terminal 30 as the first location information. The first acquisition module 301 acquires the postal code and the address transmitted from the first server 10 as the first location information.

[Determination Module]

The determination module 302 determines, when a second service provided at a designated location is used by the user, based on a predetermined condition, whether or not the first location information is to be utilized as the second location information relating to the designated location. The condition serves as a criterion for determining whether or not the first location information is to be utilized. In this embodiment, a condition relating to the current position of the user is taken as an example, but various conditions can be used, as described in the modification examples later.

To utilize the first location information means that all or a part of the first location information is acquired as all or a part of the second location information without the user manually inputting all or a part of the second location information. In this embodiment, the automatic input of the postal code and the address in the input forms F31 and F32 corresponds to utilizing the first location information. The method of utilizing is not limited to the example of this embodiment. For example, to automatically set and display the second location information on the screen without automatic input in the input forms F31 and F32 may correspond to utilizing the first location information. Further, for example, to automatically store set second location information in the second database DB2 without even displaying a screen may correspond to utilizing the first location information.

For example, the determination module 302 determines that the first location information is to be utilized when the condition is satisfied, and does not determine that the first location information is to be utilized when the condition is not satisfied. Depending on how the condition is defined, the determination module 302 may determine that the first location information is to be utilized when the condition is not satisfied, and not determine that the first location information is to be utilized when the condition is satisfied.

In this embodiment, the determination module 302 determines whether or not the first location information is to be utilized by determining whether or not the condition is satisfied based on the current position information acquired by the third acquisition module 304 described later. Accordingly, the condition in this embodiment changes depending on whether or not the condition is satisfied by the current position information.

For example, the current position information may include a reliability level of the current position, and the determination module 302 may determine whether or not the condition is satisfied by determining whether or not the reliability level is equal to or higher than a threshold value. The determination module 302 determines that the first location information is to be utilized when the reliability level is equal to or higher than the threshold value, and does not determine that the first location information is to be utilized when the reliability level is less than the threshold value. The threshold value may be a fixed value or a variable value corresponding to the current position of the user, for example.

The reliability level is an index indicating the reliability of the current position. The reliability level can also be referred to as "accuracy." It suffices that the reliability level is an index corresponding to the method of acquiring the current position. In this embodiment, the current position information is acquired by using the GPS reception unit 36, and hence a GPS signal strength corresponds to the reliability level. As the GPS signal strength becomes stronger, the reliability level becomes higher. The method itself of acquiring the reliability level may be any method as long as the GPS reliability can be measured, and various publicly known methods can be used.

When the current position information is acquired by using wireless communication by the communication unit 33, a signal strength of the wireless communication corresponds to the reliability level. As the signal strength of the wireless communication becomes stronger, the reliability level becomes higher. Further, for example, depending on the type of wireless communication, the current position may be identified in a narrow range, such as Bluetooth (trademark), or the current position may be identified only in a wide range, such as a mobile base station. Thus, the type of wireless communication used for acquiring the current position information may correspond to the reliability level. As the range becomes narrower, the position can be identified more accurately, and therefore the reliability level becomes higher.

In this embodiment, the determination module 302 determines whether or not the condition is satisfied by determining whether or not the current position is in the vicinity of the location indicated by the first location information. The vicinity of the location indicated by the first location information is a region in which the distance from the location indicated by the first location information is less than a threshold value. The determination module 302 calculates the distance between the position of the location indicated by the first location information and the current position indicated by the current position information. The determination module 302 determines that the first location information is to be utilized when the distance is less than the threshold value, and does not determine that the first location information is to be utilized when the distance is equal to or more than the threshold value. The threshold value may be a fixed value or a variable value corresponding to the current position of the user, for example.

[Second Acquisition Module]

The second acquisition module 303 acquires the second location information based on the determination result obtained by the determination module 302. When the second acquisition module 303 determines that the first location information is to be utilized, the second location information is acquired by utilizing the first location information. That is, the second acquisition module 303 acquires all or a part of the first location information as all or a part of the second location information. For example, the postal code and address indicated by the first location information are utilized and automatically input in the input forms F31 and F32. The second location information which utilizes the first location information can be modified by the user.

The second acquisition module 303 acquires the second location information based on the current position information when it is determined that the first location information is not to be utilized. For example, a postal code and address corresponding to the current position information are automatically input in the input forms F31 and F32. As the method itself of converting the current position information into a postal code and an address, various methods such as inquiring of a publicly known server can be used. When it is determined that the first location information is not to be utilized, the second acquisition module 303 may acquire second location information input by the user without using the current position information.

[Third Acquisition Module]

The third acquisition module 304 acquires the current position information relating to the current position of the user. In this embodiment, a case in which the third acquisition module 304 acquires the current position information by using the GPS reception unit 36 is taken as an example, but various publicly known methods can be used as the method itself of acquiring the current position. For example, the third acquisition module 304 may acquire the current position information by using a Bluetooth (trademark) or Wi-Fi (trademark) access point, for example, by using a mobile base station, or by a combination thereof. In addition, for example, a GNSS other than a GPS may be used.

[Display Control Module]

The display control module 305 displays each of the screens of FIG. 2 and FIG. 3 on the display unit 35 based on the app of the first service. In this embodiment, the second service is provided in the app of the first service, and therefore, based on the app of the first service, the input screen G3 of the second service is displayed based on the second location information which utilizes the first location information. For example, the display control module 305 automatically inputs the postal code and address in the input forms F31 and F32 and displays the input screen G3.

4. Processing to be Executed by Service Providing System

Figure 7:
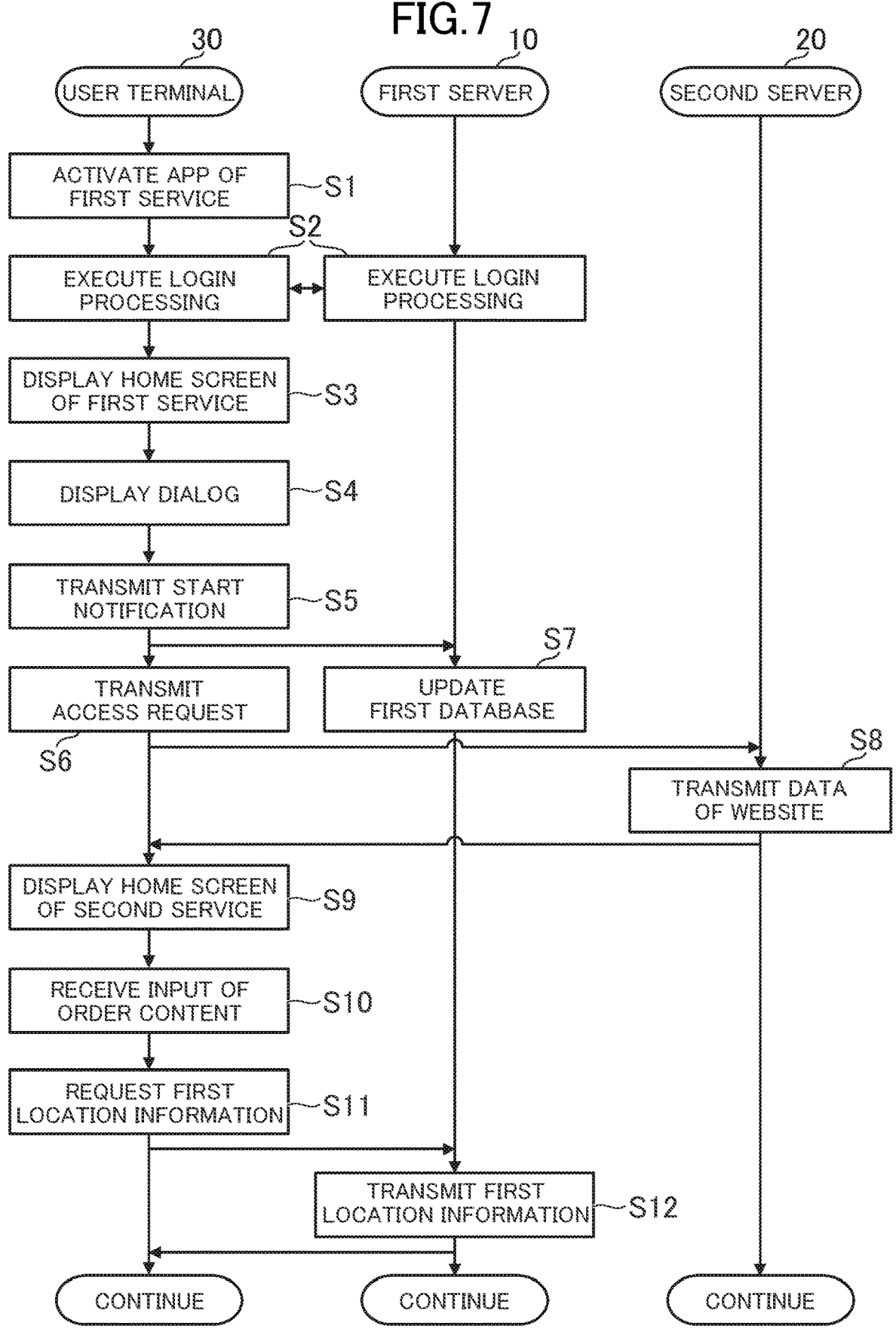
FIG. 7 is a flow chart for illustrating an example of processing to be executed by the service providing system.
Figure 8:
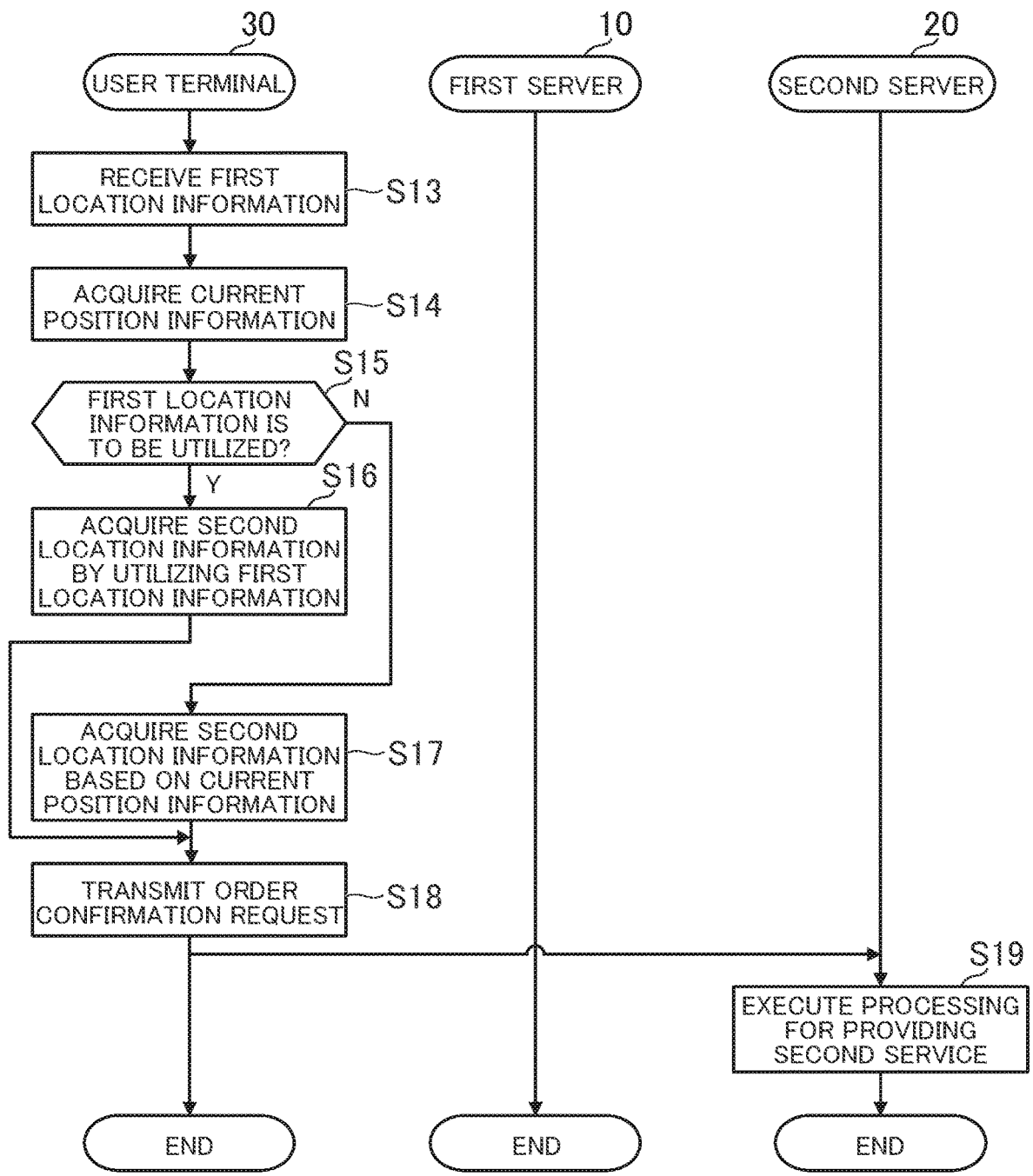
FIG. 8 is a flow chart for illustrating the example of processing to be executed by the service providing system.

FIG. 7 and FIG. 8 are flow charts for illustrating an example of processing to be executed by the service providing system S. The processing illustrated in FIG. 7 and FIG. 8 are executed by the control units 11, 21, and 31 operating in accordance with the programs stored in the storage units 12, 22, and 32, respectively. The processing of FIG. 7 and FIG. 8 is an example of processing to be executed by the functional blocks of FIG. 4.

As illustrated in FIG. 7, when the user selects the app of the first service, the user terminal 30 activates the app of the first service stored in the storage unit 32 (Step S1). The processing of the user terminal 30 described below is executed as the processing of the app of the first service.

When the app of the first service is activated, login processing for the first service is executed between the first server 10 and the user terminal 30 (Step S2). In Step S2, the login processing may be executed by requiring the user to input the user ID and password, or may be executed based on authentication information stored in the storage unit 32 without the user inputting the user ID and password.

When the login processing is successful, the user terminal 30 displays the home screen G1 of the first service on the display unit 25 (Step S3). The user terminal 30 displays the dialog D on the home screen G1 when the user selects any of the icons I10 to I14 (Step S4). Here, a description is given of the processing executed when the icon I10 is selected.

When the user selects the text T20, the user terminal 30 transmits to the first server 10 a start notification to start use of the second service (Step S5), and transmits to the second server 20 an access request to access the website of the second service (Step S6). The first server 10 receives the start notification, and updates the first database DB1 so that the user can identify that the second service has started (Step S7). The second server 10 receives the access request, and transmits the data of the website of the second service (Step S8).

The user terminal 30 receives the data of the website from the second server 10, and displays the home screen G2 of the second service on the display unit 25 as a web view in the app of the first service (Step S9). The processing executed when the button B19 has been turned on by the user is now described. When the button B19 has been turned off by the user, the processing step of Step S16 may be executed without executing the processing steps of from Step S10 to Step S15 described later, or the second location information may be manually input without executing the processing step of Step S16.

The user terminal 30 receives the input of the order content by the user (Step S10). When the operation for displaying the input screen G3 is performed, the user terminal 30 requests the first location information on the user from the first server 10 (Step S11). The first server 10 acquires the first location information on the user based on the first database DB1, and transmits the acquired first location information to the user terminal 30 (Step S12).

Referring next to FIG. 8, the user terminal 30 receives the first location information on the user from the first server 10 (Step S13). The user terminal 30 acquires the current position information based on the GPS reception unit 36 (Step S14). The user terminal 30 determines whether or not the first location information is to be utilized based on the current position information (Step S15). In Step S15, the user terminal 30 determines whether or not the first location information is to be utilized by determining whether or not the distance between the position indicated by the current position information and the position of the location indicated by the first location information is less than the threshold value.

When it is determined that the first location information is to be utilized ("Y" in S15), the user terminal 30 acquires the second location information by utilizing the first location information, and displays the input screen G3 on the display unit 35 (Step S16). The input screen G3 displayed in Step S16 is in the state of the input screen G3A of FIG. 3. The postal code and address acquired as the first location information are automatically input in the input forms F31 and F32.

When it is not determined that the first location information is to be utilized ("N" in Step S15), the user terminal 30 acquires the second location information based on the current position information, and displays the input screen G3 on the display unit 35 (Step S17). The input screen G3 displayed in Step S17 is in the state of the input screen G3B of FIG. 3. Instead of automatically inputting the first location information in the input forms F31 and F32, the current position information is converted into a postal code and an address and automatically input. When the current position information is latitude/longitude information, various publicly known methods can be used as the method itself of converting the current position information into a postal code and an address. When the current position information is other coordinate information, it is assumed that conversion data in which a relationship among coordinates, a postal code, and an address is defined is prepared in advance. The conversion data may be used to convert the current position information into the postal code and the address.

When the user selects the button B34, the user terminal 30 transmits an order confirmation request for confirming the order of the user to the second server 20 (Step S18). The request includes the order content input by the user and each of the pieces of information input on the input screen G3. The second server 20 receives the request, and executes processing for providing the second service to the user (Step S19). Then, this process ends. In Step S19, the second server 20 issues an order ID that uniquely identifies the order of the user, and creates a new record in the second database DB2. The second server 20 stores the order ID, for example, in the created record. The provider of the second service refers to the information stored in the second database DB2, and delivers the product ordered by the user to the location indicated by the second location information.

The service providing system S of this embodiment determines, when a second service is used by the user, based on a predetermined condition, whether or not the first location information is to be utilized for the second location information. The service providing system S acquires the second location information based on the result of the determination. As a result, the first location information is utilized when the first location information is supposed to be utilized, and the user is not required to input the second location information from the beginning, and hence the time and effort of input by the user can be reduced. Further, the first location information is not utilized when the first location information is not supposed to be utilized, and it is possible to prevent a situation in which the second location information is deleted and then re-input, and hence the time and effort of input by the user can be reduced. In addition, it is possible to prevent the second service from being provided at an incorrect location.

Further, the service providing system S determines whether or not the first location information is to be utilized by determining whether or not a predetermined condition is satisfied based on the current position information relating to the current position of the user. Whether or not the first location information is to be utilized may differ depending on the current position of the user, and therefore it is possible to utilize the first location information when the first location information is supposed to be utilized and not to utilize the first location information when the first t location information is not supposed to be utilized in accordance with the current position of the user. As a result, the time and effort of input by the user can be effectively reduced in accordance with the current position of the user.

Further, the service providing system S determines whether or not the predetermined condition is satisfied by determining whether or not the reliability level of the current position of the user is equal to or higher than the threshold value. When the reliability level of the current position of the user is high, the second location information may be acquired based on the current position, and therefore the time and effort of input by the user can be effectively reduced. When the reliability level of the current location of the user is low, to acquire the second location information based on the current location may mean that incorrect second location information is acquired. Thus, it is possible to prevent the second service from being provided at an incorrect location.

Further, the service providing system S determines whether or not the predetermined condition is satisfied by determining whether or not the current position is in the vicinity of the location indicated by the first location information. When the user is in the vicinity of the location indicated by the first location information, there is a high probability that the user wants to receive the second service at this location, and therefore by utilizing the first location information, the time and effort of input by the user can be effectively reduced. When the user is not in the vicinity of the location indicated by the first location information, there is a high probability that the user does not want to receive the second service at this location, and therefore by not utilizing the first location information, the time and effort of input by the user can be effectively reduced and it is possible to prevent the second service from being provided at an incorrect location.

Further, when it is determined that the first location information is to be utilized, the service providing system S acquires the second location information by utilizing the first location information. When it is determined that the first location information is not to be utilized, the service providing system S acquires the second location information based on the current position information. As a result, when the first location information is to be utilized, the user is not required to input the second location information, and therefore the time and effort of input by the user can be reduced. When the second location information is acquired based on the current position information, the user is not required to input the second location information from the beginning, and therefore the time and effort of input by the user can be reduced. Even when the current position information is slightly incorrect, in many cases, the current position information indicates the correct municipality, and only the final portion of the address is required to be modified. Consequently, the time and effort of input by the user can be reduced.

Further, the service providing system S provides a second service which can be used by the user as a guest user without the user registering as a member. This saves the user the time and effort of registering as a member. Moreover, the registration information on the user is not registered in the second service, and therefore the risk of leakage of the registration information on the user can be reduced.

Further, in the service providing system S, the app of the first service displays the screen of the second service based on the first location information utilized as the second location information. As a result, as a general rule, it is possible to complete input in the app of the first service and minimize the amount of registration information on a user who leaves the first service, and therefore the risk of leakage of the registration information on the user can be reduced.

5. Modification Examples

The present disclosure is not limited to the embodiment described above, and can be modified suitably without departing from the spirit of the present disclosure.

Figure 9:
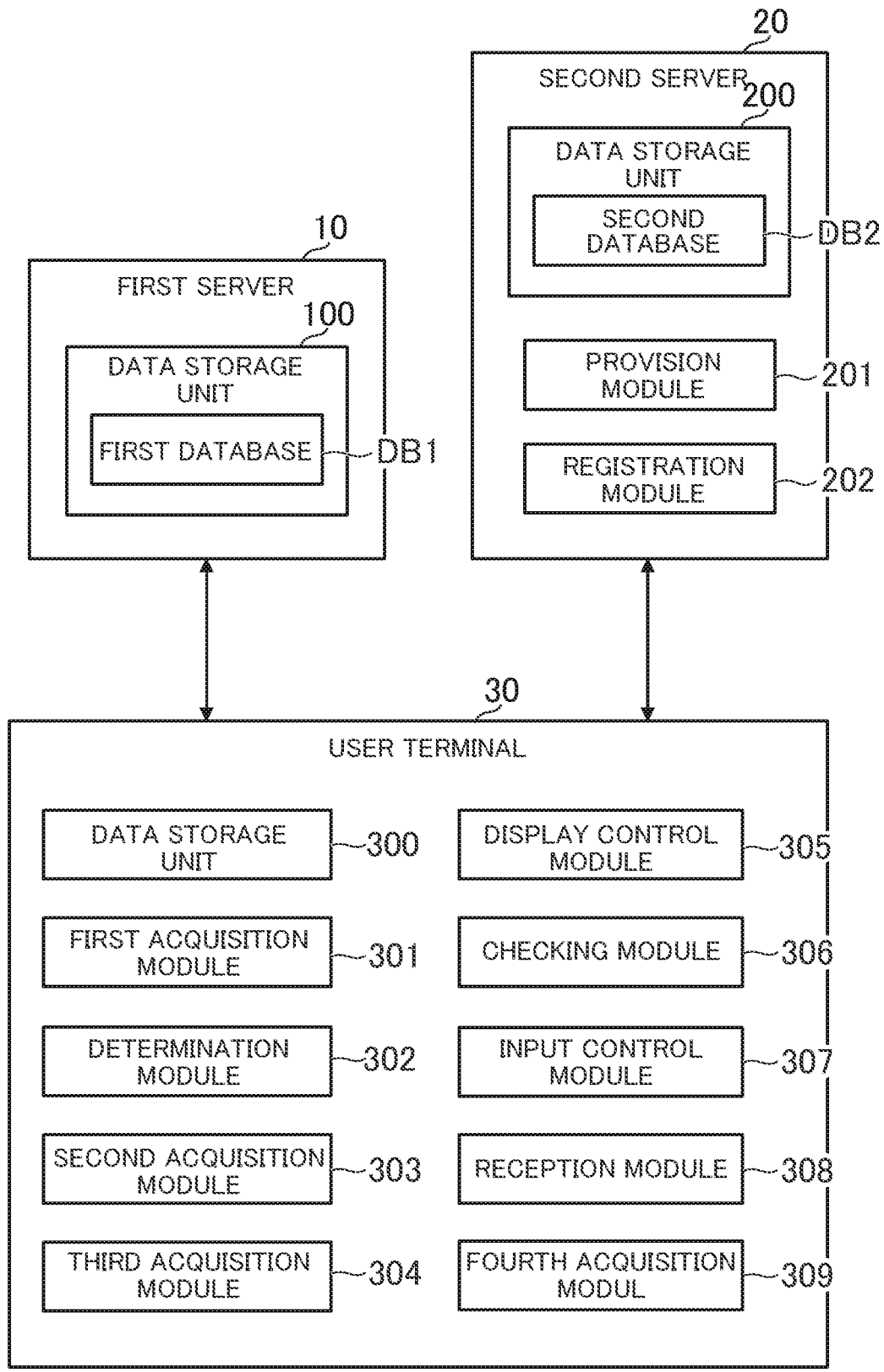
FIG. 9 is a functional block diagram in modification examples of the present disclosure.

FIG. 9 is a functional block diagram in modification examples of the present disclosure. As illustrated in FIG. 9, in the modification examples described below, a registration module 202, a checking module 306, an input control module 307, a reception module 308, and a fourth acquisition module 309 are implemented. The registration module 202 is mainly implemented by the control unit 21. Each of the checking module 306, the input control module 307, the reception module 308, and the fourth acquisition module 309 is mainly implemented by the control unit 31.

(1) For example, when the second location information is acquired based on the current position information, in some cases, the location desired by the user is not acquired accurately. To deal with this problem, the service providing system S may include the checking module 306 which prompts the user to perform checking when the second location information is acquired based on the current position information. In this modification example, a case in which the checking is performed by a visual method of displaying an image prompting checking is described, but the checking may also be performed by any one of an auditory method of outputting a sound prompting checking and a tactile method of generating vibration prompting checking.

Figure 10:
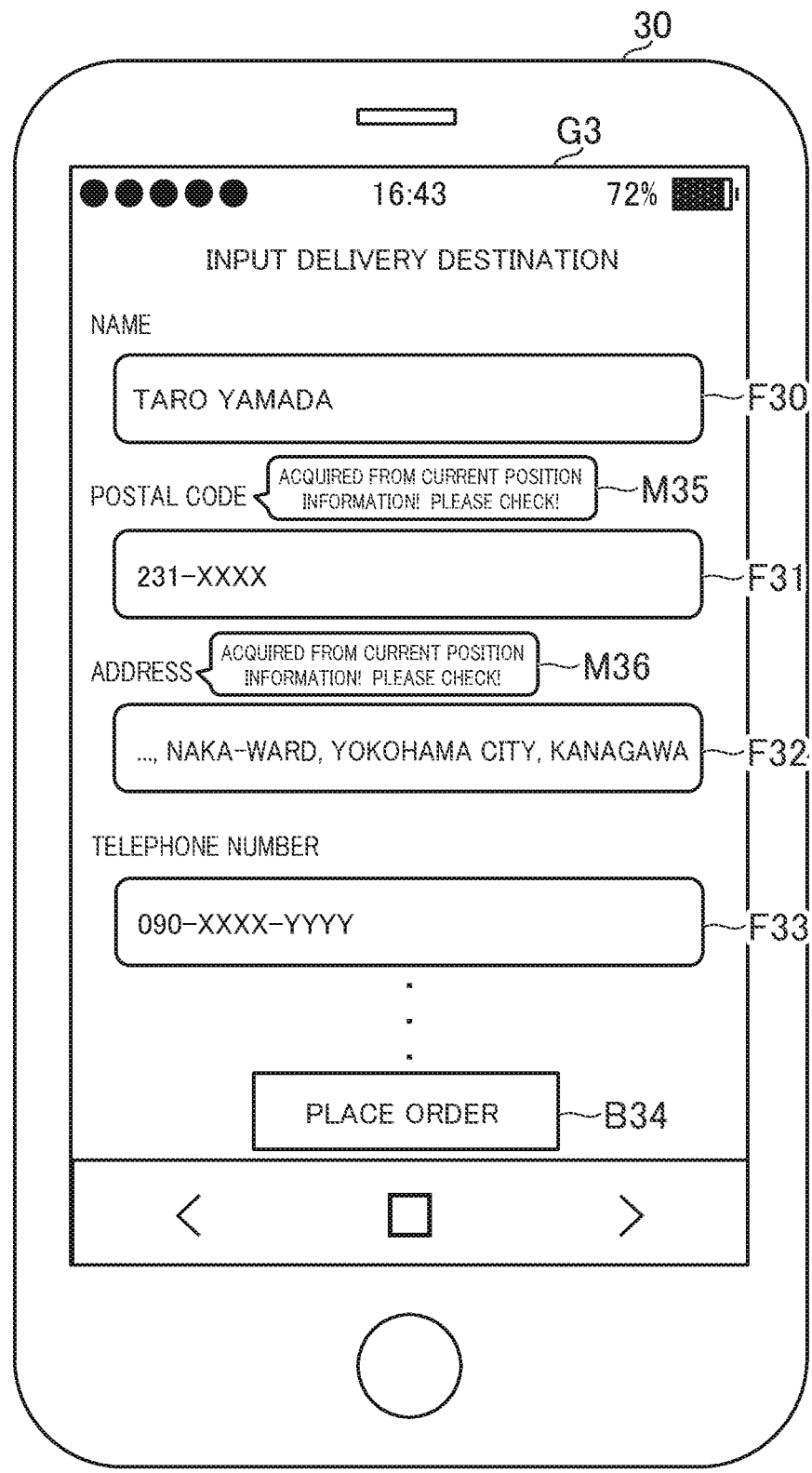
FIG. 10 is a diagram for illustrating an example of how the user is prompted to perform checking on an input screen.

FIG. 10 is a diagram for illustrating an example of how the user is prompted to perform checking on the input screen G3. As illustrated in FIG. 10, when the current position information is acquired as the second location information, the checking module 306 displays, on the input screen G3, messages M35 and M36 prompting the user to perform checking. In addition to displaying the messages M35 and M36, the checking module 306 may prompt the user to perform checking by changing the color of the input forms F31 and F32 or changing the color of the postal code and the address automatically input in the input forms F31 and F32. That is, it suffices that the checking is performed by displaying something unusual.

According to Modification Example (1), when the current position information is acquired as the second location information, it is possible to prevent the second service from being provided at an incorrect location by prompting the user to perform checking.

(2) For example, when the second location information is acquired based on the current position information, the information up to the municipality may be accurate, but the information after the street address may be inaccurate. Even when the street address is accurate, in the case of a multiple-dwelling complex, the room number is not identifiable. To deal with this problem, the service providing system S may include the input control module 307 which prompts, when the second location information is acquired based on the current position information, the user to input a remaining portion of the second location information in the input forms F31 and F32 in which a part of the second location information has been automatically input.

Figure 11:
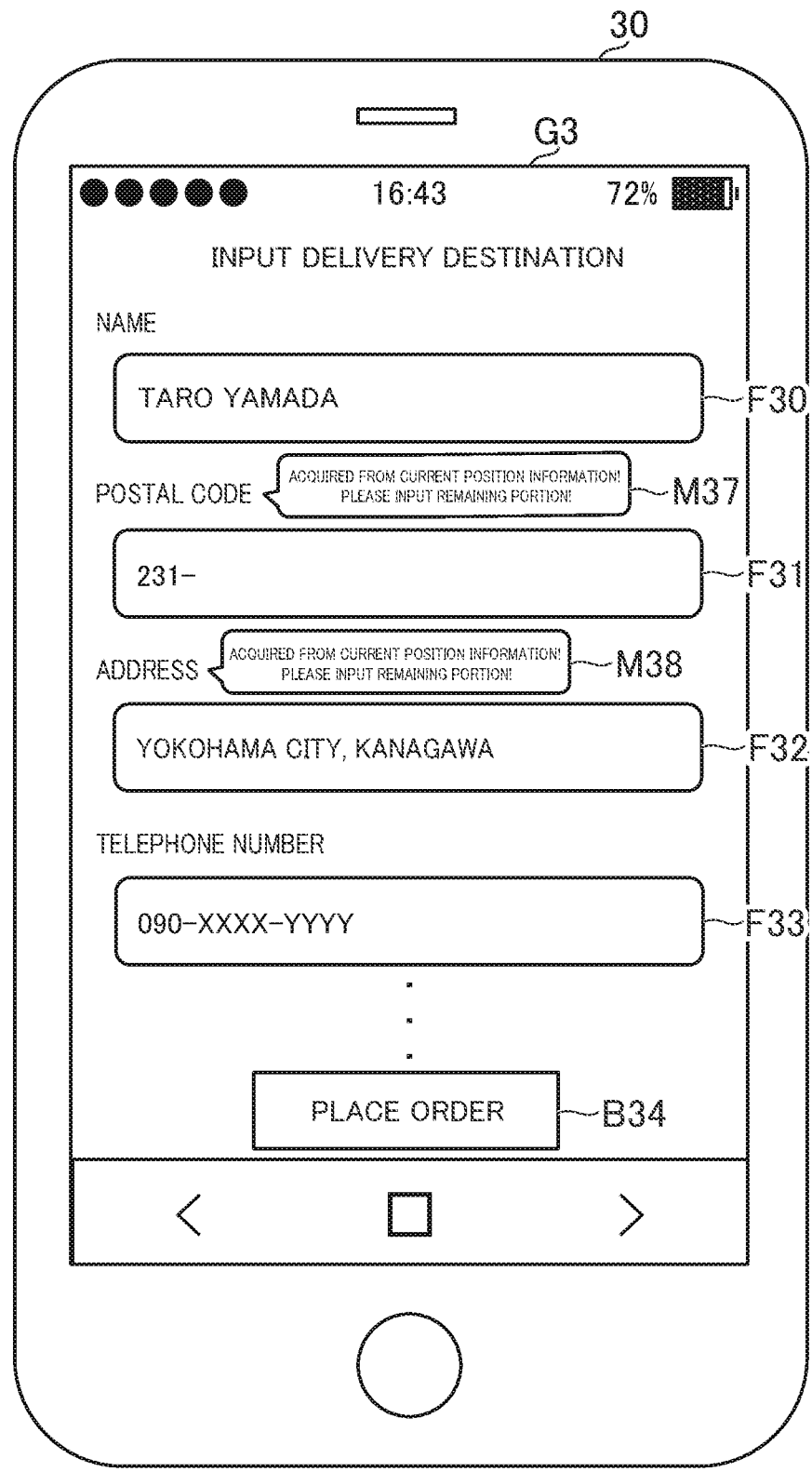
FIG. 11 is a diagram for illustrating an example of how the user is prompted to input a remaining portion of second location information on the input screen.

FIG. 11 is a diagram for illustrating an example of how the user is prompted to input a remaining portion of the second location information on the input screen G3. As illustrated in FIG. 11, the input control module 307 may automatically input the postal code corresponding to the current position information in the input form F31 up to a predetermined number of digits of the postal code, and prompt the user to input the remaining portion of the postal code.

The input control module 307 may automatically input the portion of the address up to the municipality in the input form F32 based on the current position information, and prompt the user to input the portion after that. In this modification example, a case in which the input control module 307 displays messages M37 and M38 prompting input of the remaining portion on the input screen G3 is described, but input of the remaining portion may be prompted by an auditory or tactile method as in Modification Example (1).

According to Modification Example (2), when the current position information is acquired as the second location information, by automatically inputting a portion of the current position information in the input forms F31 and F32 for inputting the second location information, and prompting the user to input the remaining portion of the second location information, the time and effort of input by the user can be effectively reduced, and it is possible to prevent the second service from being provided at an incorrect location.

(3) Further, for example, in the first service, a plurality of pieces of the first location information may be registered for a certain user. Each of the plurality of pieces of first location information indicates a location different from the others. In the first database DB1, there is at least one record in which a plurality of pieces of the first location information are associated with a certain user ID. For example, when a certain user registers the postal code and the address of each of his or her own home, workplace, home of his or her parents, and home of his or her friend, four pieces of first location information are registered for this user. It is not required for all users to register a plurality of pieces of the first location information in the first service, and only at least one user is required to register a plurality of pieces of the first location information in the first service.

The determination module 302 determines that, among the plurality of pieces of first location information, the piece of first location information having the location closest to the current position indicated by the current position information is to be utilized, and determines that the other pieces of first location information are not to be utilized. The determination module 302 calculates, for each piece of first location information, the distance from the current position indicated by the current position information. The determination module 302 determines that the piece of first location information having the shortest distance is to be utilized, and determines that pieces of first location information having the second and subsequent shortest distances are not to be utilized.

According to Modification Example (3), it is determined that the piece of first location information having the closest location to the current position indicated by the current position information among the plurality of pieces of first location information is to be utilized, and that the other pieces of first location information are not to be utilized. As a result, the optimum piece of first location information corresponding to the current position of the user can be utilized.

(4) Further, for example, in the embodiment, a case in which the second service is used by the user as a guest user is described, but in the second service, the user may register as a member. In this case, when the user selects the text T20 in the dialog D18 of FIG. 3, the registration information for the second service may be recorded in the data storage unit 200 of the second server 20 by utilizing all or a part of the registration information on the user registered in the first database DB1. The registration information for the second service may be stored in the first database DB1.

The service providing system S of Modification Example (4) includes the registration module 202 which registers, when the second location information acquired based on the current position information is modified by the user, the modified second location information in the second service. For example, when the user modifies the postal code and the address utilized in the input forms F31 and F32 of the input screen G3 of FIG. 3, the registration module 202 may register the modified postal code and address as the registration information of the user in the second service. The registration information is used when the second service is used by the user from the next time onward. The modified second location information may be made available for use as a usage history of the user from the next time onward without particularly registering as a member in the second service.

According to Modification Example (4), when the second location information acquired based on the current position information is modified by the user, by registering the modified second location information in the second service, the time and effort of input when the second service is used by the user from the next time onward can be reduced.

(5) Further, for example, the determination module 302 may determine whether or not the first location information is to be utilized by determining whether or not the condition is satisfied based on a usage history of the user in the first service. In the usage history, at least one of a usage count or a usage date and time of the first location information in the first service is stored. The usage history is updated when, in the first service, the user designates the first location information and transmits some sort of message or orders some sort of product. The usage history is stored in the first database DB1.

For example, the determination module 302 determines that the first location information is to be utilized when the usage count of the first location information is equal to or greater than a threshold value, and determines that the first location information is not to be utilized when the usage count of the first location information is less than the threshold value. As another example, the determination module 302 determines that the first location information is to be utilized when an elapsed time from use of the first location information is less than a threshold value, and determines that the first location information is not to be utilized when the elapsed time is equal to or more than the threshold value.

Further, for example, when a plurality of pieces of the first location information on the user are registered in the first service, the determination module 302 determines that the piece of first location information which is used the most frequently in the first service is to be utilized, and determines that the pieces of first location information which are used the second and subsequent most frequently are not to be utilized. Moreover, for example, the determination module 302 determines that the piece of first location information used or registered most recently in the first service is to be utilized, and determines that the pieces of first location information used or registered before that are not to be utilized.

According to Modification Example (5), it is determined whether or not the first location information is to be utilized by determining whether or not the condition is satisfied based on the usage history of the user in the first service. As a result, it is possible to utilize the first location information which is normally used by the user.

(6) Further, for example, when a plurality of pieces of the first location information on the user are registered in the first service, the determination module 302 may determine that, among the plurality of pieces of first location information, the piece of first location information determined based on a type of the second service is to be utilized, and determine that the other pieces of first location information are not to be utilized. The type of the service may be any information that can classify the content of the service. For example, the type of the service is the type of business of the service provider.

FIG. 12 is a table for showing an example of a relationship between the type of the second service and first location information to be utilized. The data showing the relationship may have any format, and is stored in the data storage unit 100 or the data storage unit 300. In this modification example, a case in which first location information on the home of the user and first location information on the workplace of the user are registered in the first service is described. The first location information is not limited to home and workplace, and any other kind of first location information can also exist. For example, there may be a type of information, such as home of parents or home of a friend, or another type of information may exist. It is assumed that the first database DB1 also stores information which identifies the type to which each piece of first location information belongs.

For example, when the type of the second service is a first type (delivery service or housekeeping service in the example of FIG. 12), the determination module 302 determines that the first location information on the home of the user is to be utilized, and determines that the first location information on the workplace of the user is not to be utilized. When the type of the second service is a second type (motorcycle courier service or vehicle dispatch reservation service in the example of FIG. 12), the determination module 302 determines that the first location information on the workplace of the user is to be utilized, and determines that the first location information on the home of the user is not to be utilized. In this way, the determination module 302 determines that the first location information of the type associated with the type of the second service is to be utilized, and determines that first location information on other types are not to be utilized.

The determination module 302 may determine the first location information to be utilized based on use of a third service by the user. The third service is a service different from the first service and the second service. In this modification example, a case in which the third service is an insurance application service is described, but the third service may be any type of service. The determination module 302 determines that the first location information used in the third service is to be utilized, and determines that the first location information which is not used in the third service is not to be utilized. Which piece of first location information is used in the third service is stored in the first database DB1 or another database.

According to Modification Example (6), it is determined that, among the plurality of pieces of first location information, the piece of first location information determined based on a type of the second service is to be utilized, and that the other pieces of first location information are not to be utilized. As a result, the optimum piece of first location information can be utilized in consideration of the type of the second service.

Further, by determining the piece of first location information to be utilized based on the use of a third service by the user, the piece of first location information used by the user in the third service can be utilized.

(7) Further, for example, in the service providing system S, a plurality of first services may be provided to the user. The app of each of the plurality of first services is installed on the user terminal 30. For example, each of the plurality of first services includes a mini app of the second service. Accordingly, the second service can also be used from any of the first services. The first location information is registered in each of the plurality of first services. Thus, for each first service, there is a first database DB1 like that described in the embodiment.

FIG. 13 is a table for showing an example of a relationship between the type of the first service utilizing the first location information and the type of the second service. The data showing the relationship may have any format, and is stored in the data storage unit 100 or the data storage unit 300. The determination module 302 determines that, among the plurality of first services, the piece of first location information registered in the first service determined based on the type of the second service is to be utilized, and determines that the other pieces of first location information are not to be utilized. The determination module 302 determines that the piece of first location information registered in the first service of the type associated with the type of the second service is to be utilized, and determines that the pieces of first location information registered in the other types of the first service are not to be utilized.

In the example of FIG. 13, when the user selects the second service, which is a pizza delivery service, there is a high probability that the user designates the location indicated by the first location information registered in the first service, which is a hamburger delivery service in the same industry. Accordingly, the determination module 302 determines that the first location information registered in the hamburger delivery service as the first service associated with the pizza delivery service as the second service is to be utilized, and determines that the first location information registered in the other first services are not to be utilized. The same applies to other examples, and the determination module 302 may determine that the first location information registered in the first service in the same industry as that of the second service selected by the user among the plurality of first services is to be utilized, and may determine that the first location information registered in other first services is not to be utilized.

According to Modification Example (7), it is determined that, among the plurality of first services, the piece of first location information registered in the first service determined based on the type of the second service is to be utilized, and determines that other pieces of first location information are not to be utilized. As a result, the optimum first location information can be utilized in consideration of the type of the second service.

(8) Further, for example, the location at which the user wants to receive the second service may differ depending on the provision time at which the second service is to be provided. Thus, the service providing system S of Modification Example (8) includes the fourth acquisition module 309 which acquires a provision time at which the second service is to be provided at the designated location. The determination module 302 determines whether or not the first location information is to be utilized by determining whether or not the condition is satisfied based on the provision time.

The provision time is the time (delivery time or visit time) at which the person or good is to be provided at the location indicated by the second location information. The provision time may be a pinpoint time indicating a certain point in time, or may be a time having a certain length. For example, the provision time is a date and time, a time period, or a day of the week. The provision time may be designated by the user from the input screen G3 or another screen, or may be automatically determined by the service providing system S. The fourth acquisition module 309 acquires the provision time designated by the user or the automatically determined provision time. It is assumed that the provision time is also stored in the second database DB2 in this modification example.

FIG. 14 is a table for showing an example of a relationship between the provision time of the second service and first location information to be utilized. The data showing the relationship may have any format, and is stored in the data storage unit 100 or the data storage unit 300. In this modification example, a case in which first location information on the home of the user and first location information on the workplace of the user are registered in the first service is described.

For example, the user may want the second service to be provided at the workplace during a daytime time period, and may want the second service to be provided at his or her home during a nighttime time period. Thus, when the provision time is in a daytime time period, the determination module 302 determines that the first location information on the workplace is to be utilized, and determines that the first location information on his or her own home is not to be utilized, and when the provision time is in a nighttime time period, the determination module 302 determines that the first location information on his or her own home is to be utilized, and determines that the first location information on the workplace is not to be utilized. The same applies to other provision times, and the determination module 302 may determine that the first location information of the type associated with the provision time of the second service is to be utilized, and determine that the first location information of other types is not to be utilized.

According to Modification Example (8), it is determined whether or not the first location information is to be utilized by determining whether or not the predetermined condition is satisfied based on the provision time at which the second service is provided to the designated location. As a result, the optimum first location information corresponding to the provision time of the second service can be utilized.

(9) Further, for example, in a case in which registration information is registered in the second service, when the user logs in to the second service, this means that the user shows his or her intention to use the registration information, and therefore the determination module 302 may determine whether or not the first location information is to be utilized by determining whether or not the condition is satisfied based on login to the second service by the user. The determination module 302 determines that the first location information is to be utilized when the user does not log in to the second service, and does not determine that the first location information is to be utilized when the user logs in to the second service.

According to Modification Example (9), it is determined whether or not the first location information is to be utilized by determining whether or not the condition is satisfied based on the login to the second service by the user. As a result, when the user shows his or her intention to use the registration information of the second service by logging in to the second service, the registration information is used, and therefore the time and effort of input by the user can be effectively reduced and it is possible to prevent the second service from being provided at an incorrect location.

(10) Further, for example, each of the first service and the second service is not limited to the examples of the embodiment. Each of the first service and the second service may be any service, for example, an electronic payment service, an electronic commerce service, a restaurant reservation service, a travel reservation service, a ticket reservation service, a financial service, an insurance service, a content distribution service, a cleaning service, or a package pickup service. The first service may be any service that serves as the utilization source of the first location information, and the second service may be any service that is the utilization destination of the first location information. A certain provider may provide a plurality of services, and therefore the provider of the first service and the provider of the second service are not required to be different, and those providers may be the same. It should be noted, however, that the second service is a service for providing some sort of person or good at a location in the real world.

For example, when the app of the electronic payment service corresponds to the super app, the first service may be an electronic payment service and the second service may be a service other than an electronic payment service. In this case, when the user uses the second service from the app of the first service, the payment in the second service may be executed by using the first service. It is assumed that the user has registered information relating to the payment means in the first database DB1. In the first service, any payment means can be used, and for example, a credit card, a debit card, electronic money, electronic cash, points, virtual currency, a bank account, or a wallet can be used. For payment, the information stored in the IC chip 37 may be referred to.

(11) Further, for example, the modification examples described above may be combined.

Further, for example, the app of the first service is not required to be an app called "super app," and the app of the second service is not required to be an app called "mini app." The app of the first service and the app of the second service may be separate as apps. Further, for example, a case in which the main functions are implemented by the user terminal 30 has been described, but each function may be implemented by the first server 10 or the second server 20. Each function may be implemented by a computer other than the first server 10 or the user terminal 30, or may be shared by a plurality of computers.

The invention claimed is:

1. A service providing system, comprising at least one processor configured to:
   acquire first location information registered by a user in a first service;
   receive an order for a second service to be provided at a delivery location used by the user;
   acquire current position information relating to a current position of the user which includes a reliability level of the current position;

determine whether a predetermined condition is satisfied based on whether the reliability level is equal to or higher than a threshold value;

wherein the predetermined condition is a criterion for determining whether or not to utilize the first location information as a second location information which indicates the delivery location;

determine that the first location information is not to be utilized as the second location information based on a determination that the predetermined condition is not satisfied; and acquire the second location information based on a result of determining that the first location information is not to be utilized as the second location information.

2. The service providing system according to claim 1, wherein the at least one processor is configured to determine whether the predetermined condition is satisfied by determining whether the current position is in a vicinity of a location indicated by the first location information.

3. The service providing system according to claim 1, wherein the at least one processor is configured to acquire the second location information by utilizing the first location information when it is determined that the first location information is to be utilized, and to acquire the second location information based on the current position information when it is determined that the first location information is not to be utilized.

4. The service providing system according to claim 3, wherein the at least one processor is configured to prompt the user to perform checking when the second location information is acquired based on the current position information.

5. The service providing system according to claim 3, wherein the at least one processor is configured to prompt the user to input a remaining portion of the second location information in an input form in which a part of the second location information has been automatically input when the second location information is acquired based on the current position information.

6. The service providing system according to claim 1,
wherein a plurality of pieces of the first location information on the user are registered in the first service, and
wherein the at least one processor is configured to determine that, among the plurality of pieces of the first location information, a piece of first location information having a location closest to the current position indicated by the current position information is to be utilized, and to determine that other pieces of first location information are not to be utilized.

7. The service providing system according to claim 1, wherein the at least one processor is configured to register, when the second location information acquired based on the current position information is modified by the user, the modified second location information in the second service.

8. The service providing system according to claim 1, wherein the at least one processor is configured to determine whether the first location information is to be utilized by determining whether the predetermined condition is satisfied based on a usage history of the user in the first service.

9. The service providing system according to claim 1,
wherein a plurality of pieces of the first location information on the user are registered in the first service, and
wherein the at least one processor is configured to determine that, among the plurality of pieces of the first location information, a piece of first location information determined based on a type of the second service is to be utilized, and to determine that other pieces of first location information are not to be utilized.

10. The service providing system according to claim 9, wherein the at least one processor is configured to determine one of the plurality of pieces of the first location information to be utilized based on use of a third service by the user.

11. The service providing system according to claim 1,
wherein the first location information is registered in each of a plurality of the first services, and
wherein the at least one processor is configured to determine that a piece of first location information registered in, among the plurality of the first services, a first service determined based on a type of the second service is to be utilized, and to determine that other pieces of first location information are not to be utilized.

12. The service providing system according to claim 1, wherein the at least one processor is configured to acquire a provision time at which the second service is to be provided at the designated location,
wherein the at least one processor is configured to determine whether the first location information is to be utilized by determining whether the predetermined condition is satisfied based on the provision time.

13. The service providing system according to claim 1, wherein the at least one processor is configured to determine whether the first location information is to be utilized by determining whether the predetermined condition is satisfied based on login to the second service by the user.

14. The service providing system according to claim 1,
wherein the second service is a service which is usable by the user as a guest user without registering as a member, and
wherein the at least one processor is configured to execute processing for providing the second service to the user based on the second location information without registering the second location information in the second service.

15. The service providing system according to claim 14,
wherein a user terminal of the user has an application for using the first service installed thereon,
wherein the second service is provided in the application of the first service, and
wherein the user terminal is configured to display, based on the application of the first service, a screen of the second service based on the second location information which utilizes the first location information.

16. The service providing system according to claim 1,
wherein there are a plurality of predetermined conditions; and
wherein the predetermined condition changes to a second predetermined condition depending on whether the predetermined condition is satisfied by a current position information of the user.

17. A service providing method, comprising:
acquiring first location information registered by a user in a first service;
receiving an order for a second service to be provided at a delivery location used by the user;
acquiring current position information relating to a current position of the user which includes a reliability level of the current position;
determining whether a predetermined condition is satisfied based on whether the reliability level is equal to or higher than a threshold value;
wherein the predetermined condition is a criterion for determining whether or not to utilize the first location information as a second location information which indicates the delivery location;

determining that the first location information is not to be utilized as the second location information based on a determination that the predetermined condition is not satisfied; and acquiring the second location information based on a result of determining that the first location information is not to be utilized as the second location information.

18. A non-transitory computer-readable information storage medium for storing a program for causing a computer to function as:

acquire first location information registered by a user in a first service;

receive an order for a second service to be provided at a delivery location used by the user;

acquire current position information relating to a current position of the user which includes a reliability level of the current position;

determine whether a predetermined condition is satisfied based on whether the reliability level is equal to or higher than a threshold value;

wherein the predetermined condition is a criterion for determining whether or not to utilize the first location information as a second location information which indicates the delivery location;

determine that the first location information is not to be utilized as the second location information based on a determination that the predetermined condition is not satisfied; and acquire the second location information based on a result of determining that the first location information is not to be utilized as the second location information.

\* \* \* \* \*